ELECTRONIC SYSTEMS KEYBOARD AND SWITCH MATRIX

Filed May 22, 1964 2 Sheets-Sheet 1

INVENTORS
ALBERT CHALFIN
MARTIN SCHNEIDER
BY: Harry M. Saragovitz,
Edward J. Kelly, Herbert Berl &
J. Dubroff
ATTORNEYS:

Dec. 20, 1966 A. CHALFIN ET AL 3,293,640

ELECTRONIC SYSTEMS KEYBOARD AND SWITCH MATRIX

Filed May 22, 1964 2 Sheets-Sheet 2

INVENTORS
ALBERT CHALFIN
MARTIN SCHNEIDER
BY: Harry M. Saragovitz,
Edward J. Kelly, Herbert Berl &
S. Dubroff
ATTORNEYS:

3,293,640
ELECTRONIC SYSTEMS KEYBOARD AND SWITCH MATRIX

Albert Chalfin, Philadelphia, Pa., and Martin Schneider, Los Angeles, Calif., assignors to the United States of America as represented by the Secretary of the Army

Filed May 22, 1964, Ser. No. 369,647
13 Claims. (Cl. 340—365)

The invention described herein may be manufactured and used by or for the Government for governmental purposes without the payment to us of any royalty thereon.

The present invention relates to electronic systems keyboards and switch matrices or assemblies of the type adapted to control a plurality of circuits in producing off-on signals and the various elements of a code signal, as in a computer system for example.

It is an object of this invention to provide an improved keyboard and switch matrix of this type.

It is also an object of this invention to provide an improved switch element for a keyboard and switch matrix of the above type which is inherently sealed against moisture and explosive atmospheres, while being relatively thin and compact in construction for applications where space is limited.

It is also a further object of this invention to provide an improved and simplified switch element for a keyboard and switch matrix of the type referred to which operates to positively control a circuit function without making and/or breaking electrical contacts and without the use of mechanical linkages which provides an inherent resistance to severe physical shock and vibration.

In accordance with one form of the invention and the above objectives, a multiple-unit keyboard is provided for use as an input device for a digital computer. This includes a number of switches with control elements or keys arranged as a numerical keyboard. Each switch or key includes a flexible control member in a thin sheet or plate of phosphor bronze or like spring material on which may be marked indicia representative of the digit for which a code signal is to be generated. Actuated by each control member is a capacity type switch means which provides a rapid and relatively-high degree of capacitance change in response to operation by said control member. This change in capacitance is of such magnitude as to provide a corresponding high degree of switching control in connection with suitable control circuits in an electrical or electronic system, such as a computer, where the change (increase) in capacitance may be transformed into an on-off signal and then into digital information by suitable electronic circuits therein.

The invention will be better understood from the following description of certain embodiments thereof when considered in connection with the accompanying drawings, and its scope is indicated by the appended claims.

Figure 1:
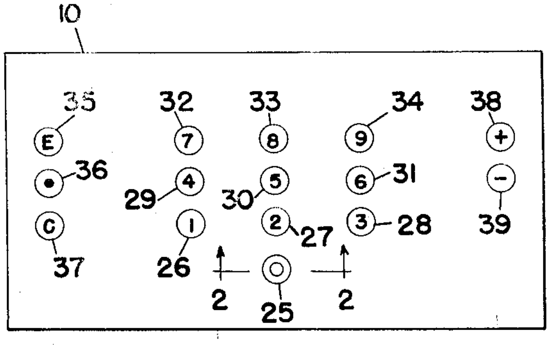
FIG. 1 is a top view of an electronics systems keyboard arranged in accordance with the invention.
Figure 2:
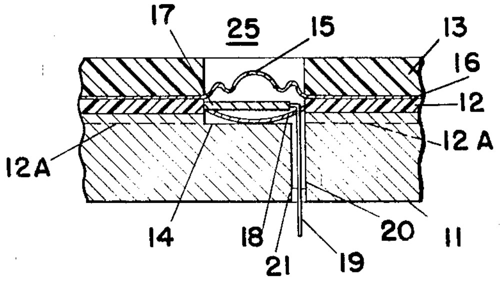
FIG. 2 is an enlarged section view in elevation, of one of the identical key or switch elements of the keyboard of FIG. 1, taken on the section line 2—2 and showing the construction thereof in accordance with the invention.

Referring to the drawings, wherein like elements throughout the several figures are designated by like reference characters, and referring particularly to FIGS. 1 and 2, a numerical keyboard 10 is provided with a number of keys or switch elements, 25–39 inclusive, marked, by way of example, for applying input information to a computer system. This form of keyboard may thus be used as an input device for a digital computer. The keys or switch elements are all of like construction and as shown in FIG. 2.

This construction includes an electrically-conductive base plate 11, preferably of metal such as copper or brass, a non-conductive or insulating plastic spacer or spacer plate 12, and generally, but not in all cases, a ceramic or like insulating top plate 13. The ceramic plate 13 and insulating spacer plate 12 are perforated to provide recesses or operating openings at the location of each key. At each of these perforations or openings, the base 11 may be provided with a corresponding well or recess 14 for receiving variable capacitor means forming part of the key or switch element. However, the spacer plate 12 may, in general, be made thick enough, as indicated by the dotted lines 12A, to provide recesses of sufficient depth to receive the switch elements of each key. At each of the keys, a flexible bowed spring member or control element 15 is provided for actuating the capacitor means in a switching operation which provides a sharp and rapid capacity change. Each flexible control element is circular in form with an outer or radially outer annular groove or fold from which is bowed outwardly as indicated in cross-section in FIG. 2. It may be made of Phosphor bronze or like spring sheeting approximately .005 inch thick and may have printed on it one or another of the insignia appearing in FIG. 1.

Normally, the flexible control elements 15 for all of the keys are stamped into a single sheet 16 which is of a size to cover the entire keyboard. The control element 15 at each key is normally bowed outwardly and provides an audible click or sound when depressed and released. With the base plate 11 bonded to the spacer plate 12, the plate or sheet 16 of flexible control elements is bonded to the spacer plate and, since it may be formed without any openings, provides a gas and water-tight seal or cover element for the keyboard and switch means therein.

In each capacitor element, a flat anodized aluminum disk 17 is located in each well or recess and spaced from the base 11 at the bottom thereof by a bowed spring element or spring element or spring 18 and is movable against the tension of the spring 18 by pressure upon the control element 15. A circuit connection lead 19 for the disk 17 extends through an opening 20 in the base 11. The opening about the lead is sealed by suitable means such as a body of sealing compound 21. The control element 15 may also be connected or grounded to the base 11 to provide a shield for the capacitor means. The disk 17 may be approximately ⅝ inch in diameter and ⅛ inch thick and spaced from the base 11 by the spring 18. The anodized surface of the disk is an insulator whereby the metallic spring 18 does not short the disk to ground with the base 11. The anodized surface or surface layer also has a relatively high dielectric constant. Under these conditions, pressure upon the control element and movement of the disk toward the conductive base 11 rapidly changes the capacitance between the disk 16 and the base 11. A change in capacitance caused by movement of a capacitor disk by as little as .04 inch may be sensed by an electronic circuit and changed into digital information as hereinafter explained.

The control elements 15 are so formed that a minimum of force is required to deflect them from the normal arched or raised position shown, through dead-center to a downwardly or inwardly-bowed or depressed position in driving contact with the respective associated capacitor plate. The generated force of the inwardly bowed control element serves to reduce the separation of the disk and base plate to substantially that of the anodized coating on the disk, and thus provides a maximum capacity change. In doing this each control element provides an audible click as well as deforming to apply a sharp moving force of relatively high magnitude to the associated capacitor disk. Thus, in response to a relatively light force applied to the control element 15, a sharp and relatively large capacity change is obtained.

Figure 3:
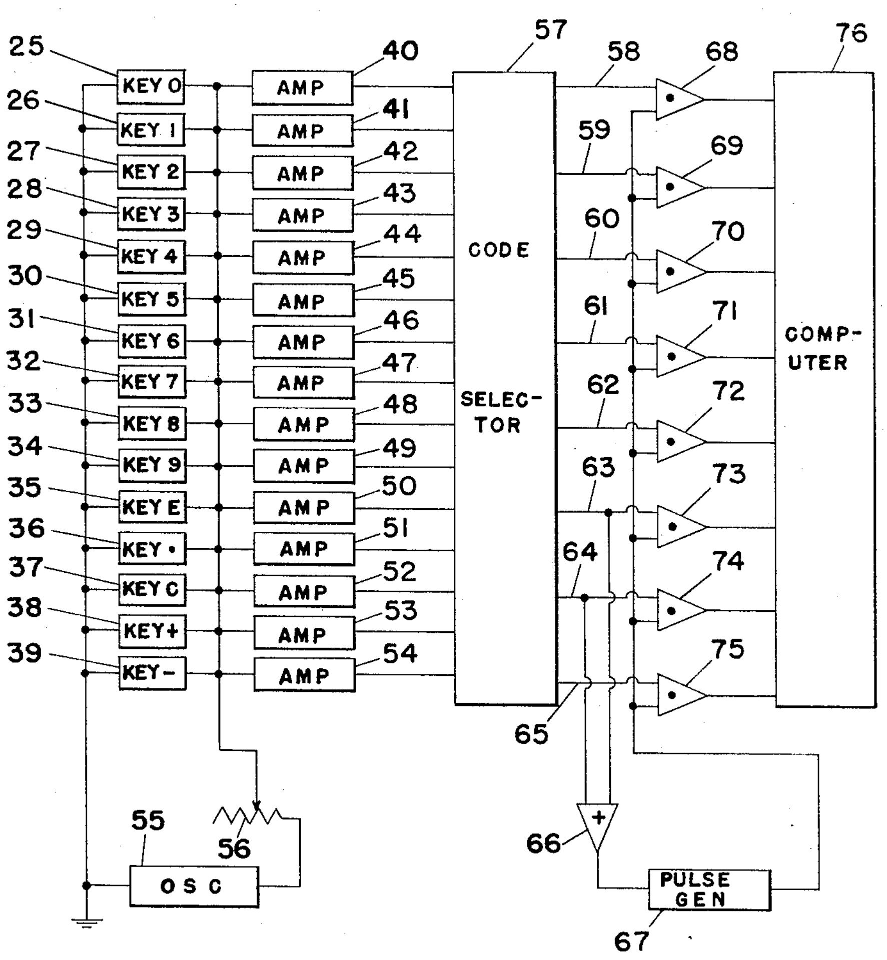
FIG. 3 is schematic circuit diagram in block form, showing the switch elements of the keyboard of FIG. 1 connected as a numerical input device for a computer system, in accordance with invention.

The basic details of an electronic circuit of the computer input type for which the keyboard and switch matrix of the present invention is particularly adapted, are indicated in block diagram form in FIG. 3. They include the plurality of keys or switch elements 25 to 39 inclusive and amplifiers 40 to 54 inclusive, and a code selector 54 and oscillator 55. The amplifiers are each energized from a suitable voltage source (not shown) upon the application of operating pressure to and activation of any one of the keys. The latter receive energy from the oscillator 55 through a control resistor 56. The oscillator may provide a 40 kc. signal at 20 volts for the keys. Each amplifier upon its operation provides a suitable signal to the code selector 57 which, in turn, provides a voltage level on certain of the eight output code lines 58–65 inclusive. The combination is fixed by the particular 8-level code assigned to each key.

In the illustrated application, each of the codes utilizes a signal on either the 6th or 7th code lines, that is, on lines 63 or 64. These lines are gated through an OR gate 66 to indicate that a key has been depressed. The output of the gate is used to trigger the pulse generator 67 which provides the proper timing and interlock functions required by the computer. The signal is then fed, together with each of the eight code lines 58–65, to AND gates 68–75. Thus the computer 76 is presented not only with the proper code but also with a pulse of the proper duration.

Figure 4:
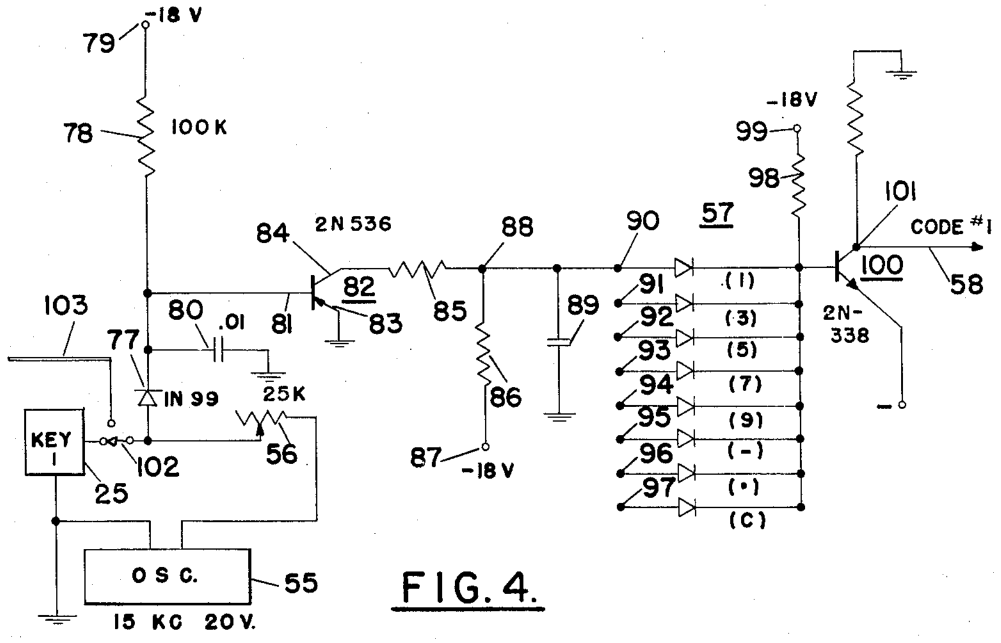
FIG. 4 is a further schematic circuit diagram illustrating the electrical connections involved in the delivery of a code element selected by one of the keys or switch elements in the system of FIG. 3.

The circuit diagram of FIG. 4 shows the connections of the Code #1 signal line. The line 58 is selected as the example shown here. The connections of the other signal output lines are similar but with the difference that they are connected to different combinations of elements.

Briefly referring to FIG. 4, for a further understanding of the use of the keyboard and switch matrix of the present invention, it is seen that the key 25, for example, has one of its terminals connected to a grounded terminal of the oscillator 55 and has its other terminal connected to the anode of a diode 77 and to the movable contact of the control resistor 56. The other terminal of the resistor 56 is connected to the oscillator.

The cathode of the diode 77 is connected through a resistor 78 to an operating current supply terminal 79 which is maintained at a potential of −18 volts. The junction between the resistor 78 and 77 is connected to ground through a storage or control capacitor 80 and to the base 81 of a transistor amplifier 82. The emitter 82 of this transistor amplifier is grounded and its collector 84 is connected through coupling resistors 85 and 86 to a −18 volt current supply terminal 87. The junction 88 between the resistors 85 and 86 is connected to ground through a filter capacitor 89 and to a terminal 90 of an OR gate which includes input diodes 91–97 and a resistor 98 connected with an operating-current supply terminal 99. The output circuit of the OR gate is connected to the base of an output transistor 100 which provides at its output terminal 101 the signal for the code line #1 shown as line 58 in FIG. 3. Other input circuits to the OR gate are from the keys which require this code line in their unique code group.

The connections of all the keys are similar to those of the key 25 shown, with exception that no two keys have the same composition of signal elements as indicated by the following tabulation.

| Code line No.: | Signal elements |
|---|---|
| 1 | 1, 3, 5, 7, 9, —, ., c |
| 2 | 2, 3, 6, 7, + |
| 3 | 4, 5, 6, 7, ., c, E |
| 4 | 8, 9, ., c |
| 5 | 0, 1, 2, 3, 4, 5, 6, 7, 8, 9, ., c |
| 6 | 0, 1, 2, 3, 4, 5, 6, 7, 8, 9, —, +, . |
| 7 | c, E |
| 8 | 1, 2, 4, 7, 8, ., c |

Each signal element of the above code signals is selected by actuation of the correspondingly identified key. When the key is in its standby position, the positive half cycle of the sine wave output of the oscillator 55 charges the capacitor 80 to a positive voltage which is sufficient to overcome the negative bias of the base 81 of the amplifier 82. The discharge time of the capacitor 80 is such that the base remains positive during the negative half cycle of the sine wave. Therefore the transistor or amplifier 82 is cut off and the voltage at the terminal 90 is approximately −14 volts and no signal is transmitted through the transistor 100 to the output lead 58 of the code selector.

When the key 25 is depressed, however, the switching capacitance increases. The resulting additional charge required by the key causes the voltage across the capacitor 80 to decrease enough to allow the base 81 to become negative. Thereupon, the transistor 82 almost saturates and the voltage at the terminal 90 becomes −3 volts. The resistor 85 and the capacitor 89 function as a filter to smooth out the ripple caused by the oscillator 55.

The circuits of all the keys are similar to those of the key 25 in that they function to produce at the input leads of the code elements, through their respective OR gates, a potential which is either −3 or −14 volts. Considering any group of code elements, a code signal is delivered to the corresponding output lead of the code selector 57 only when one of its code elements have an input potential of −3 volts. Otherwise, the transistor 100 is cut off and the code selector output lead 58 is at ground potential. As previously indicated, any transmitted code signal is not registered in the computer 76 (FIG. 3) until a pulse is transmitted to it from the pulse generator 67.

An alternative method of operating the key switching circuit is provided by moving a switch 102 (FIG. 4) from its illustrated lower closed position to its upper closed position. In this position of the switch, the key 25 and its capacitor disk 17 is replaced in the control circuit by a free metal disk 103 having stray capacity to ground. Touching this free disk or bringing a finger in proximity to it actuates the control circuit by capacity change switching in the same way it is operated by applying a pressure to the key. In each case the capacitance is increased, causing the voltage across the capacitor 80 to decrease to a point such that the base 81 of the amplifier becomes negative, the transistor 82 becomes almost saturated and the voltage at the terminal 90 becomes −3 volts.

The computer system above described indicates one of many control uses for the keyboard and switch matrix of the present invention, and the applications of the capacitive-switching elements thereof to control circuit functions without involving electrical contacts.

As is well known, the capacitance of a parallel-plate capacitor is directly proportional to the dielectric constant and inversely proportional to the separation of the plates. Thus in the standby condition of any control element 15, the spacing between the disk 17 and the base 11 is relatively large and the capacitance is small. When the control element 15 is depressed, however, the spacing between the disk 17 and the base 11 is decreased and the capacitance is increased. The anodize coating or layer on the disk is a good dielectric and functions to greatly increase the capacitance as it is brought close to the base plate. The spring 18 is a conductor and is also in electrical contact with the base.

Normally, as noted, the control elements 15 for all of the keys or switches are stamped into a single sheet of spring material which covers the entire keyboard. This may or may not be covered by the plate 13 of ceramic or like insulating material. Any suitable material may be used if the sheet 16 is covered, as by a panel (not shown) for the keyboard.

Each control element 15 is effectively a flexible clicker-type button which is deformed or bowed upwardly and snaps through a dead-center position downwardly only when depressed sufficiently by applied pressure, manually or otherwise. Normally, but not necessarily, each control element 15, therefore, may provide an audible sound or click in flexing back and forth when the key or element is depressed or released, and individually, or in sheet form, provides the upper part, or one face or cover, of a gas and water-tight seal for the switch matrix. In certain installations, conventional push-button or like means may be provided for operating each key element 15 from above the keyboard.

As previously indicated, this keyboard provides a simplified gas and water-tight structure. It is compact and rugged and operates without the making and breaking of electrical contacts and without the use of mechanical linkages. It can be expanded to control any number of circuits.

We claim:

1. An electronic switch element for capacitance control of a circuit function, comprising in combination, a conductive baseplate, an insulating spacer plate bonded to said base plate and providing a recess therein, a conductive disk in said recess having an insulating dielectric surface coating, means engaging said disk along one dielectric surface coating to resiliently hold said disk with said surface coating spaced from said base plate in a minimum capacitive relation thereto, a sheet of spring metal bonded to the spacer plate on the opposite side from the baseplate to seal said switch element against moisture and gaseous atmospheres, and a depressible outwardly-bowed flexible circular control element integral with said sheet and aligned with said disk to snap into driving engagement therewith when depressed and inwardly bowed in the opposite direction, thereby to rapidly reduce the space between the disk and the base plate and bring the said dielectric surface coating into close maximum capacitive relation with the base plate for effective capacitance switching change and circuit control thereby.

2. An electronic switch element as defined in claim 1, wherein the disk is of aluminum, and wherein the dielectric surface coating thereon is anodized aluminum.

3. An electronic switch element as defined in claim 1, wherein the outwardly-bowed control element is of the clicker type adapted to emit a sound pulse when depressed and bowed inwardly and to emit a similar sound pulse when released to return to the outwardly-bowed form, thereby to provide audible indication of and a manual feel for the operation thereof.

4. An electronic switch element for capacitance control of a circuit function comprising in combination, a conductive base plate, an insulating spacer plate bonded to the base plate and providing a recess therein, a conductive disk in said recess having an insulating dielectric surface coating and adapted to move toward and away from said base plate in variable capacitive relation, a bowed spring element in said recess between the disk and the base plate engaging said disk along one dielectric surface coating to resiliently hold said disk with said surface coating spaced from said base plate, a sheet of spring metal bonded to the spacer plate on the opposite side from the base plate to seal said switch element against moisture and gaseous atmospheres, a depressible outwardly-bowed flexible circular control element in said sheet with a surrounding annular fold and aligned with said disk to snap into driving engagement therewith when depressed and inwardly bowed in the opposite direction, thereby to rapidly reduce the space between said disk and the base plate and bring the said dielectric surface coating into close relation with said base plate for effective capacitance switching change and circuit control thereby, and means providing circuit connections with said base plate and disk.

5. An electronic keyboard for applying input information to electronic computer systems and the like, comprising, a plurality of variable-capacity type switching elements, means providing a common conductive switch base for said elements having an extended surface area, insulating spacer means attached to said base over said surface area and having an outer free surface, said spacer means having a plurality of recesses therein corresponding to the number of switch elements and arranged in a predetermined keyboard pattern over said outer free surface, a conductive disk for each of said switch elements located in each of said recesses in spaced capacitive relation to said base, each of said disks having an insulating dielectric surface coating and adapted to resiliently move in the recess toward and away from said base to vary said capacitive relation, a thin metal sheet attached to the spacer means along said outer free surface to seal said keyboard against moisture and gaseous atmospheres, a plurality of depressible outwardly-bowed flexible circular control elements integral with said sheet in alignment one with each of said recesses and the disk therein to snap and bow inwardly into driving engagement with the disk individually by selective manual operation, thereby to rapidly reduce the space between a selected disk and the common base and bring the dielectric surface coating thereof into close maximum capacity relation with said surface area of the base for effective capacitance switching change and circuit control thereby.

6. An electronic keyboard as defined in claim 5, wherein the disks are of anodized aluminum to provide the dielectric surface coatings thereon, and wherein sealed circuit connection means are provided through the base with the individual disks.

7. An electronic keyboard as defined in claim 5, wherein the disks are connected with the individual control circuits and signal amplifiers for applying said input information to an electronic code selector for a computer system, and wherein a common source of oscillations is provided for said control circuits.

8. An electronic keyboard as defined in claim 5, wherein a common source of oscillations having a common ground return connection with the base is further provided with individual control circuit connections with each of said capacitor switching disks and a signal translating amplifier.

9. An electronic keyboard as defined in claim 8, wherein at least one of the disk connections is adapted to be switched to alternate capacitor means including a fixed capacitor plate for direct manual control.

10. An electronic systems keyboard and switch matrix comprising in combination, a conductive base, a plurality of conductive disks resiliently supported on said base and electrically insulated therefrom, each of said disks forming with said base a separate variable-capacitor switching element for said switch matrix, a single thin sheet of spring metal providing a sealing element for said switch matrix and having a plurality of annular bowed and flexible control elements integral therewith, each of said control elements being positioned in juxtaposition to a different one of said capacitors disks and compressible with a snap action to engage and move the respective disks to increase the capacitance of the corresponding capacitor switching element provided thereby, and means connected with said capacitor switching elements for separately sensing rapid increases in capacitance effected thereby.

11. An electronic systems keyboard and switch matrix comprising in combination, a conductive support element having a plane surface, an insulating spacer plate bonded to and covering a portion of said surface, said spacer plate having a plurality of recesses therethrough spaced over and terminating at said covered surface of the support element, a plurality of metallic disks each resiliently supported in a different one of said recesses and each forming with said support element separate variable capacitor means, a plurality of compressible annular control elements each integral with and flexibly mounted in a single sheet of supporting material in juxaposition to a different one of said capacitor means and each compressible with snap action to change the capacitance thereof in a rapid switching action, said sheet of supporting material being bonded to said spacer plate, and means connected with said capacitor means for separately sensing said rapid capacitance changes.

12. An electronic systems keyboard and switch matrix as defined in claim 11, wherein said disks are of anodized aluminum providing a high dielectric in said capacitor means to enhance the capacitance change and the switching action on said sensing means.

13. In an electronic keyboard, the combination of, means providing conductive and substantially rigid base plate, a plurality of anodized aluminum disks resiliently supported on said base, each of said disks forming with said base separate variable capacitor means, means including a sheet of spring metal providing a plurality of flexible control elements each mounted in juxtaposition to a different one of said capacitor means, each of said control elements being outwardly bowed and compressible inwardly with a snap action to apply a sharp driving force to the associated disk and rapidly change the capacitance of the capacitor means provided thereby with the base, and means connected to said capacitor means for separately sensing said changes in capacitance.

No references cited.

NEIL C. READ, *Primary Examiner.*

THOMAS B. HABECKER, *Examiner.*